United States Patent [19]

Patek

[11] Patent Number: 4,459,756
[45] Date of Patent: Jul. 17, 1984

[54] APPARATUS AND METHOD FOR MEASURING THE EFFECTIVE SUPPORT HEIGHT OF A CONTAINER BASE CUP

[75] Inventor: Frank J. Patek, Whitehouse, Ohio

[73] Assignee: Owens-Illinois, Inc., Toledo, Ohio

[21] Appl. No.: 394,366

[22] Filed: Jul. 1, 1982

[51] Int. Cl.³ .............................................. G01B 5/02
[52] U.S. Cl. ................................ 33/172 R; 33/174 L
[58] Field of Search ............ 33/169 R, 169 B, 172 E, 33/172 R, 174 L, 172 B

[56] References Cited

U.S. PATENT DOCUMENTS

| | | | |
|---|---|---|---|
| 2,632,955 | 3/1953 | Samuelson | 33/169 B X |
| 3,217,418 | 11/1965 | Wennerberg | 33/172 R |
| 3,513,555 | 5/1970 | Vachon | 33/172 E |
| 4,037,325 | 7/1977 | Weber et al. | 33/172 E X |
| 4,187,612 | 2/1980 | Scott | 33/172 E |
| 4,306,448 | 12/1981 | Rohde | 33/172 R |

Primary Examiner—William D. Martin, Jr.
Attorney, Agent, or Firm—Thomas L. Farquer; M. E. Click

[57] ABSTRACT

An apparatus and method for measuring the effective support height of a base cup for a container having a convex bottom includes a preform corresponding to the container bottom which is secured to a sensing member of a linear translation indicating device. The apparatus is preferably utilized on a planar surface and the indicating device is zeroed while the preform is placed in contact with surface. The base cup is then positioned below the preform, the preform is lowered into contact with the base cup and the effective support height of the cup is read on the indicating device.

5 Claims, 7 Drawing Figures

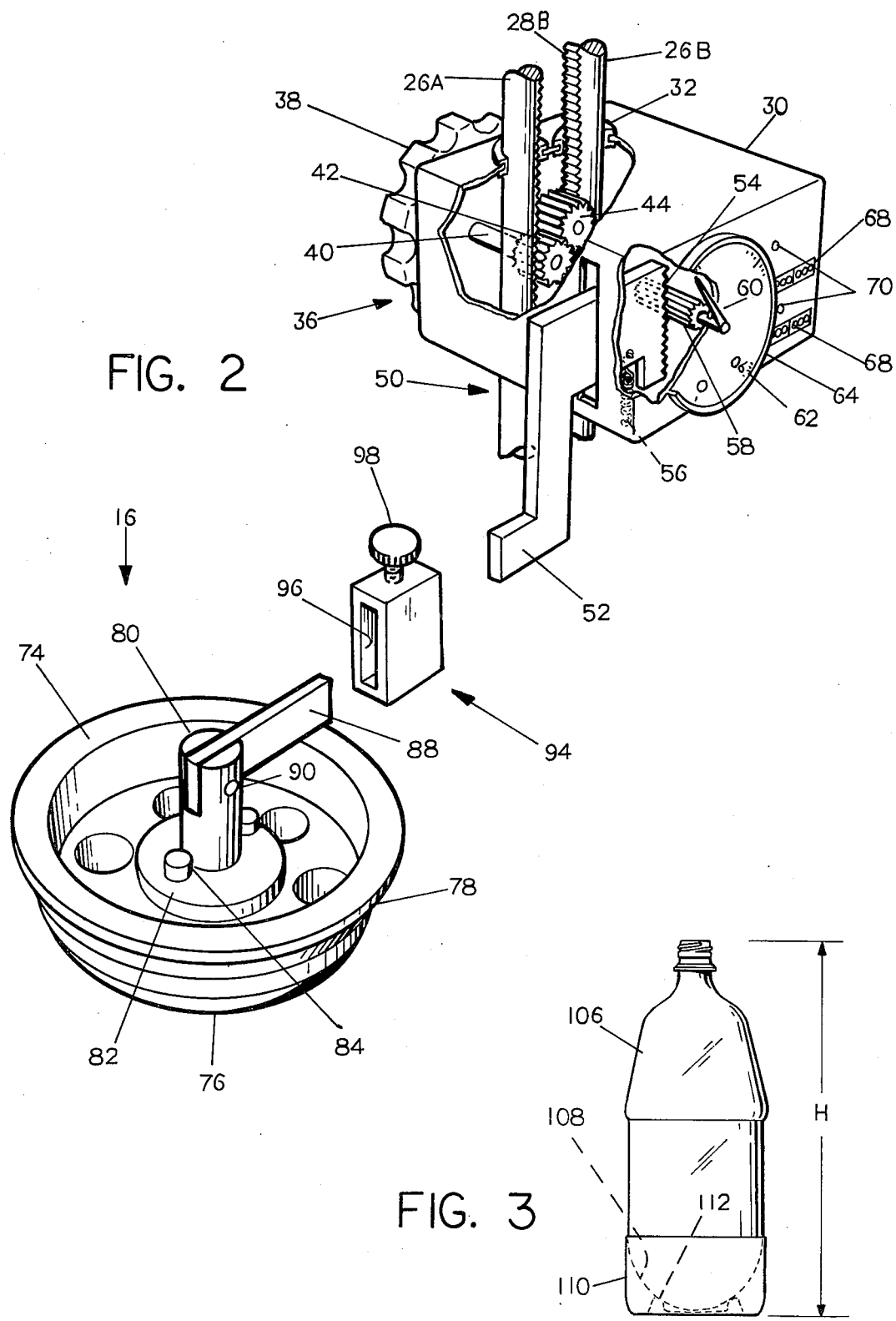

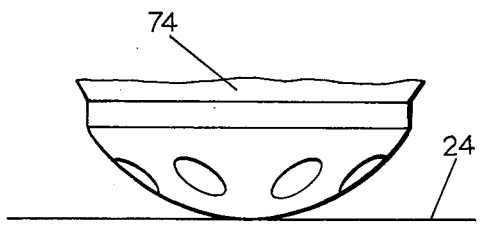
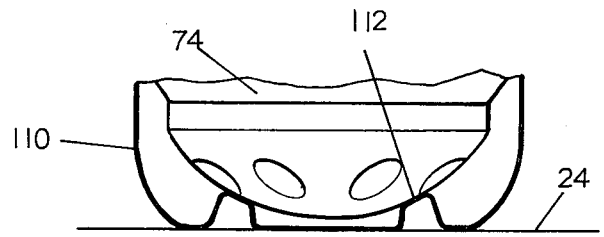
FIG. 6     FIG. 7
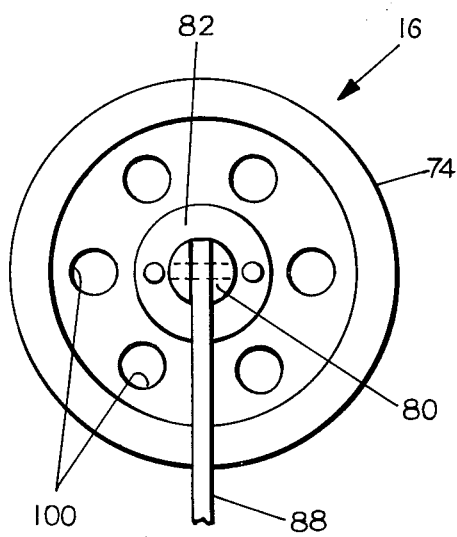
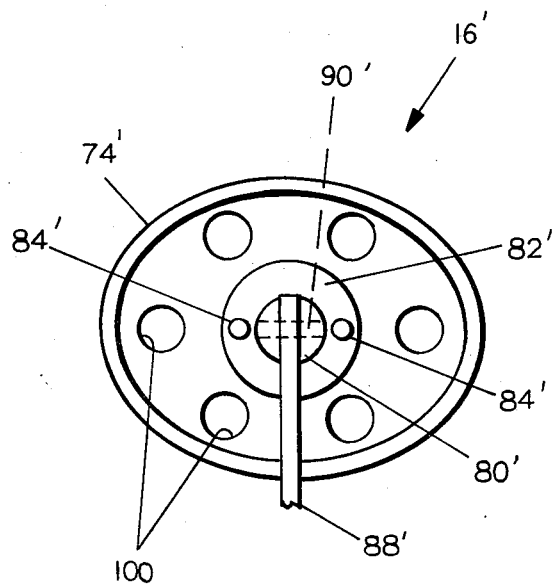
FIG. 4     FIG. 5

APPARATUS AND METHOD FOR MEASURING THE EFFECTIVE SUPPORT HEIGHT OF A CONTAINER BASE CUP

BACKGROUND OF THE INVENTION

The invention relates generally to measuring devices and more specifically to a method and apparatus for measuring the effective support height of a container base cup.

Direct linear measurement is perhaps the simplest of the measurement sciences. It is likewise perhaps the oldest and from the simplest measurements taken by repeated use of a standard length to laser interferometry, the technology of measurement has kept pace with technology in other disciplines. Regardless of the mode of measurement, a constraint common to the majority of devices and techniques is that the linear distance to be measured be actual or tangible. For example, a micrometer or calipers specifically measures by direct contact the diameter or thickness of an object. Radar, sonar and laser measurement techniques, in fact, are similarly constrained in that measurement is made of a tangible, physical separation of objects. A substantial number of situations, however, do not permit the luxury of direct physical measurement but require measurement of related dimensions or interrelated components in order to determine a particular measurement. An example of this situation is the determination of the diameter or radius of a truncated circular object representing less than a semi-circle. Since the object extends about less than 180° of arc, neither the diameter or the radius can be directly measured but must be determined by combined measurement and calculation steps.

A similar measurement difficulty exists in determining the overall dimension of devices assembled from interfitted components. If the components are static i.e., unadjustable and are assembled such that tolerance stack up may result in extraordinarily wide variation of the overall size of an object, measurement or determination of the size by means other than measuring the final assembled device are generally inadequate. This situation often requires tight tolerance control to maintain the overall object size within acceptable limits. Unfortunately, such dimensional and tolerance control is expensive and adversely effects the ultimate cost of the device.

Another answer is provided by the instant invention whereby provision is made to measure one of a pair of components prior to their assembly in order to determine an effective dimension of such one component and thus predict the overall height of the combination of the components prior to their assembly.

SUMMARY OF THE INVENTION

The instant invention comprises an apparatus and method for measuring the effective support height of a base cup for a container having a convex bottom. The measurement device includes a preform which corresponds to the profile of a particular container bottom such as a hemispherical profile or hemi-ellipsoidal profile. The preform is connected to a translating measurement arm of a linear translation indicating device such as a dial indicator. When the preform is inserted into a corresponding base cup, the preform is raised above the support surface by a linear distance equal to the linear support height provided by the given base cup to a corresponding container. The device thus effectively measures the support height of a given base cup in order to determine whether the base cup design provides appropriate support height. Clearly, the effective support height of a base cup can not be directly measured and thus a device according to the instant invention provides a unique and convenient measurement technique for measuring same.

It is thus an object of the instant invention to provide an apparatus for measuring the effective support height of a base cup of a container having a convex bottom.

It is a further object of the instant invention to provide a method and apparatus for measuring the effective support height of a base cup of a container having a convex bottom.

It is still a further object of the instant invention to provide an apparatus and method for measuring the support height of a base cup of a container having a hemispherical bottom.

It is still a further object of the instant invention to provide a measurement apparatus comprising a preform corresponding to a container bottom and a linear translation indicating device for measuring the height above a planar surface to which a base cup will raise a container corresponding to the preform.

Further objects and advantages of the instant invention will become apparent by reference to the following description of the preferred embodiment and appended drawings.

BRIEF DESCRIPTION OF THE DRAWINGS

FIG. 2 is an exploded, perspective view with portions broken away of a container base cup gauge according to the instant invention;

FIG. 3 is an elevational view of a container having a hemispherical bottom and base cup secured thereto;

FIG. 4 is a top, planar view of a container base cup gauge preform corresponding to a circular container;

FIG. 5 is a top, planar view of a container base cup gauge preform corresponding to an elliptical container;

FIG. 6 is a elevational view of a container base cup gauge preform during the preliminary step of zeroing the linear indicating device; and FIG. 7 is an elevational view of a container base cup gauge preform positioned within a container base cup during measurement of the effective support height of the container base cup.

DESCRIPTION OF THE PREFERRED EMBODIMENT

Figure 1:
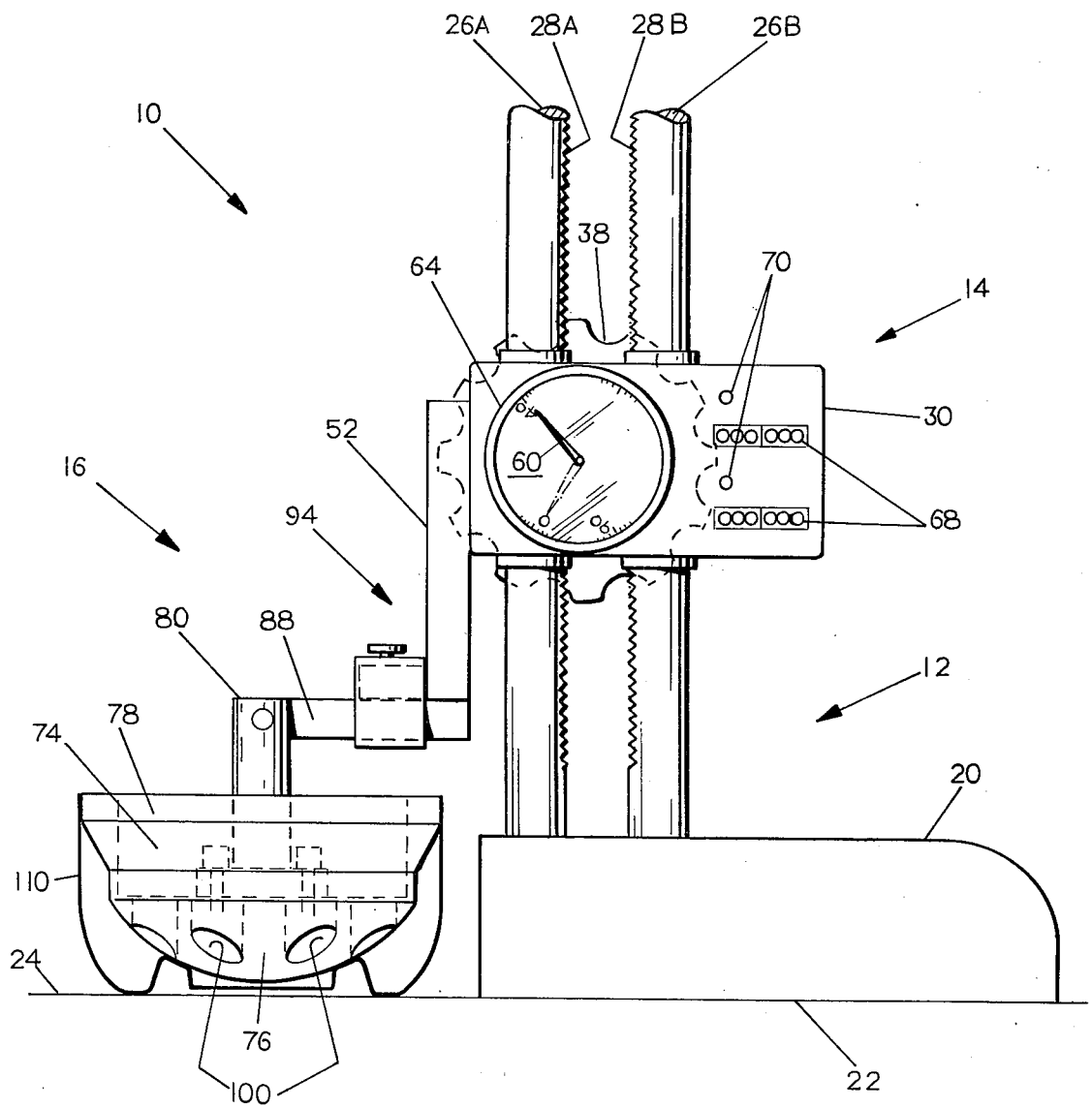
FIG. 1 is a front, elevational view of a container base cup gauge.

Referring now to FIG. 1, apparatus for measuring the effective support height of a container base cup is illustrated and generally designated by the reference numeral 10. The measurement apparatus 10 includes a support assembly 12, a linear translation indicator assembly 14 and an interchangeable measuring head assembly 16. The support assembly 12 includes a weighted base 20 having a planar bottom surface 22 which rests stably upon a planar surface 24 such as a table top or similar structure. Received in suitable recesses (not illustrated) in the base 20 are a pair of elongate support rods 26A and 26B. Preferably, support rods 26A and 26B are oriented precisely normal to the planar bottom surface 22 of the base 20 and are thus parallel to one another. Each of the elongate rods 26A and 26B includes a gear rack 28A and 28B, respectively, disposed on adjacent faces thereof.

Referring now FIGS. 1 and 2, the linear translation indicator assembly 14 includes a generally rectangular housing 30 having bushings 32 secured thereto which slidably receive the elongate support rods 26A and 26B. The linear translation indicator assembly 14 also includes a vertical drive assembly 36. The vertical drive assembly 36 permits controlled and substantially backlash free vertical motion of the linear translation indicator assembly 14 relative to the support assembly 12. The vertical drive assembly 36 includes a hand wheel 38 which is secured to a stub shaft 40 having a pinion gear 42 formed or secured to its opposite end. The pinion gear 42 meshes with a second pinion gear 44. The pinion gear 42 also meshes with the gear rack 28A on the elongate support rod 26A and the pinion gear 44 also meshes with the gear rack 28B on the elongate support rod 26B. Rotation of the hand wheel 38 thus causes the housing 30 and the linear translation indicator assembly 14 to ascend or descend the elongate support rods 26A and 26B of the support assembly 12.

The linear translation indicator assembly 14 also includes a linear translation indicating mechanism 50 which generally comprises a motion or translation sensing arm 52 having a gear rack 54 disposed within the housing 30. A tension spring 56 secured between the sensing arm 52 and the housing 30 provides a return or biasing force to the arm 52. A pinion gear 58 which may be but one component of a gear train is engaged by the gear rack 54 on the arm 52 and rotates in response to translation of the arm 52. The pinion gear 58 is coupled to an indicator 60 which rotates around a calibrated scale 62 to indicate linear translation of the arm 52. The scale 62 is mounted within a rotatable ring 64 which permits zero reference calibration of the scale 62 and indicator 60 in accordance with conventional practice. As a convenience, the linear translation indicator assembly 14 may also include digital readouts 68 which may indicate motion of the arm 52 digitally in various measurement scales such as inches and millimeters. Reset buttons 70 associated with the digital readouts 68 provide zero reference calibration of the readouts 68 in a fashion similar to the moveable ring 64, again in accordance with conventional measurement practice and techniques.

Finally, the measurement apparatus 10 includes the measuring head assembly 16. The measuring head assembly 16 encompasses generally a plurality of interchangeable measurement preforms or heads 74 having surfaces which duplicate the shape of the lower portion of a container or other article of manufacture. Specifically, the measurement head 74 includes a hemispherical surface 76 which duplicates the lower hemispherical portion of the container and a circumferential, vertical edge region 78 which corresponds to the lower portion of the vertical side wall of a container. The region of the measurement head 74 between the hemispherical portion 76 and edge portion 78 may be in any configuration which does not interfere with the measurement procedure. The measurement head 74 includes a centrally disposed stanchion 80 having a shoulder 82. The shoulder 82 includes at least a pair of apertures through which conventional threaded fasteners 84 may pass into blind openings in the measurement head 74 in order to removeably secure the stanchion 80 thereto. The stanchion 80 also defines a radially oriented through slot 86 which receives a horizontal beam 88. The horizontal beam 88 is rigidly secured to the stanchion 80 by means of a drive pin 90. The measuring head assembly 16 is selectively secured to the linear translation indicator assembly 14 by means of a coupler assembly 94 defining a rectangular opening 96 for receiving both the horizontal beam 88 and a horizontal portion of the arm 52. The coupler assembly 94 includes a threaded thumb wheel 98 which may tightened or loosened to selectively secure or release these members, respectively, as will be readily understood.

Referring now to FIGS. 4 and 5, the measuring head assembly 16 and an alternate embodiment measuring head assembly 16′ are illustrated. Inasmuch as the purpose of the measuring head assembly 16 and particularly the measurement head 74 is to duplicate the lower portion of a container or other article, it should be readily appreciated that a selection of measurement heads will be required to duplicate all various containers or articles. As an example of same, the alternate embodiment measurement head 74′ illustrated in FIG. 5 is oval or elliptical in plan view. The alternate embodiment head 74′ includes a stanchion 80′ having a shoulder 82′ and threaded fasteners 84′. It likewise includes a horizontal beam 88′ secured to the stanchion 80′ by means of a drive pin 90′. The measuring heads 74 and 74′ may also include through openings such as the apertures 100 and 100′, respectively, which lessen the weight of the measurement head 74 and 74′, thereby reducing stress on other components of the measuring apparatus 10 and improving the overall measurement accuracy thereof. It should be understood that diverse shapes of measurement heads 74 may be utilized with the measuring apparatus 10 and such use is comprehended by the instant invention.

The operation of the measurement apparatus 10 will be described next. In order to fully understand and appreciate the utility of the instant invention, it is beneficial to examine the goal of the measurement technique. In FIG. 3, a container 106 which is typically produced in a one liter or two liter size includes a hemispherical bottom region 108. The hemispherical bottom region 108 is cradled within a base cup 110 having a spherically conforming support band 112 which receives the hemispherical bottom region 108 of the container 106. Although various measurements may be made directly on the base cup 110, the critical measurement is the overall height "H" of the bottle 106 when placed within the base cup 110. If the height the container 106 is known, and it is readily and directly measured, the measurement that then becomes critical is the effective support height of the base cup 110, i.e., that height which the base cup 110 raises the container 106 above the surface upon which it is resting. This height measurement can be readily determined by the use of the measurement apparatus 10 according to the instant invention.

With reference to FIGS. 1, 6 and 7, the method of height measurement according to the instant invention will now be described. As a preliminary step, it is necessary to chose the measurement head 74 which corresponds to the lower profile of the container or other article intended for assembly with a given base cup 110 or similar support component. The selected measurement head 74 is then secured to the sensing arm 52 of the linear translation indicating assembly 14 by means of the collar assembly 94. The measurement head 74 is then placed into contact with the planar surface 24 upon which the support assembly 12 is disposed. Next, the hand wheel 38 is rotated to move the linear translation indicating assembly 14 up or down such that the sensing arm 52 is somewhat above its lower vertical travel limit. At this time, the reset buttons 70 are depressed to reset the digital readouts 68 and the rotatable ring 64 and calibrated scale 62 are rotated to zero indication of the indicator 60.

Referring now to FIG. 7, with the linear travel indicating assembly 14 zeroed, the measurement head 74 is raised vertically and the base cup 110 which is to be measured is placed centrally and concentrically under the measurement head 74. As FIG. 7 makes apparent, the measurement head 74 will now be raised a fixed distance above the planar surface 24. This fixed distance is the effective support height of the container base cup 110 and may be read from either the pointer 60 and calibrated scale 62 or the digital readouts 68. By utilization of the instant method, the effective support height of base cups 110 of various designs, or particular prototypes, or various units from a production line or resulting from other processes which may induce variables may be measured in order to determine the total height of a container such as the container 106 illustrated in FIG. 3 when it is disposed within and supported by the base cup 110.

It should be understood that the instant device and method will find broad and general adaptation in any measurement application where, as here, direct measurement of an important variable cannot be taken directly due to the configuration of a component but must be accomplished by the use of preforms corresponding to other components with which the measured component will be assembled.

The foregoing disclosure is the best mode devised by the inventor for practicing this invention. It is apparent, however, that methods, and apparatus incorporating modifications and variations will be obvious to one skilled in the art of linear measurement. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. In the determination of the overall height of a container package comprising a container having a side wall and a convex bottom surface and a base cup having a side wall engaging the side wall of the container and a base wall having a base surface complementary to and engaging a portion of the convex bottom surface of the container such that the overall height of the container package is determined by the engagement of the side walls and the base wall surfaces of the base cup and the container, the method which comprises
   bringing a sensing head into engagement with a planar surface,
   said sensing head having a peripheral edge portion corresponding to the cross sectional dimension of the side wall of the container which is engaged by the side wall of the base cup and a base portion complementary to the portion of the convex bottom surface of the container which engages the complementary surface on the base wall of the cup,
   measuring the position of the sensing head when in engagement with the planar surface,
   placing the base cup on the planar surface,
   inserting the sensing head in the base cup with the edge portion of the sensing head engaging the interior of the side wall of the base cup and the base portion of the base cup engaging the base surface of the base cup,
   measuring the height of the sensing head in the inserted position in said base cup,
   and determining the difference between the two measurements such that the addition of the difference to the overall height of the container determines the overall height of the container.

2. In the determination of the overall height of a container package comprising a container having a side wall and a convex bottom surface and a base cup having a side wall engaging the side wall of the container and a base wall having a base surface complementary to and engaging a portion of the convex bottom surface of the container such that the overall height of the container package is determined by the engagement of the side wall surfaces and the base wall surfaces of the base cup and the container, the apparatus which comprises
   means defining a planar surface,
   a linear distance measuring device having translating means for sensing a linear translation coupled to means for indicating such linear translation,
   mounting means for adjustably supporting said linear distance measuring device,
   a sensing head having a peripheral edge portion corresponding to the cross sectional dimension of the side wall of the container which is engaged by the side wall of the base cup and a base portion complementary to the base surface portion of the convex bottom surface of the container which engages the complementary surface on the base wall of the cup,
   means for mounting said sensing head on said linear translation sensing means such that the apparatus may be used to determine the overall height of a container package by bringing the sensing head into engagement with the planar surface, utilizing the linear distance measuring device to establish a first reading on the device, placing the base cup on the planar surface, inserting the sensing head in the base cup with the edge portion of the sensing head engaging the interior of the side wall of the base cup and the base portion of the base cup engaging the base surface of the base cup to establish a second reading, noting the difference between the two readings of the linear distance measuring device such that the addition of the difference to the overall height of the container determines the overall height of the container package.

3. The apparatus set forth in claim 2 wherein the edge portion of said sensing head is circular in cross section.

4. The apparatus set forth in claim 3 wherein said sensing head has a base portion which is hemispherical.

5. The apparatus set forth in claim 3 wherein said sensing head has a base portion which is hemi-elliptical.

* * * * *